United States Patent
Wang et al.

(10) Patent No.: US 8,910,188 B1
(45) Date of Patent: Dec. 9, 2014

(54) DETERMINISTIC DATA PROCESSING

(75) Inventors: Yuewei Wang, San Jose, CA (US); Algis P. Rudys, Mountain View, CA (US); Stewart Yang, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 312 days.

(21) Appl. No.: 13/428,249

(22) Filed: Mar. 23, 2012

Related U.S. Application Data

(60) Provisional application No. 61/507,849, filed on Jul. 14, 2011.

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |

(52) U.S. Cl.
USPC ........................................................ 719/318

(58) Field of Classification Search
USPC ........................................................ 719/318
See application file for complete search history.

(56) References Cited

U.S. PATENT DOCUMENTS

| | | | |
|---|---|---|---|
| 7,650,331 B1 * | 1/2010 | Dean et al. ................... | 712/203 |
| 8,074,059 B2 | 12/2011 | Mendes et al. | |
| 8,571,930 B1 * | 10/2013 | Galperin .................... | 705/14.43 |
| 2008/0189352 A1 | 8/2008 | Mitchell et al. | |
| 2009/0165006 A1 | 6/2009 | Ceze et al. | |
| 2009/0235262 A1 | 9/2009 | Ceze et al. | |
| 2010/0281078 A1 * | 11/2010 | Wang et al. .................. | 707/812 |
| 2011/0302164 A1 * | 12/2011 | Krishnamurthy et al. .... | 707/737 |

* cited by examiner

*Primary Examiner* — Andy Ho
*Assistant Examiner* — Timothy A Mudrick
(74) *Attorney, Agent, or Firm* — Fish & Richardson P.C.

(57) ABSTRACT

Methods, systems, and apparatus, including computer programs encoded on a computer storage medium, for processing event data. In one aspect, a method includes assigning events to event bundles based on timestamps associated with the events. Each event bundle contains events having timestamps that are within a pre-specified period of time. Event batches are created, where each event batch includes a pre-specified number of event bundles. A first event batch is provided to a first computing group and a second computing group. The first computing group is configured to perform a first processing stage, and the second computing group is configured to perform a second processing stage. A determination is made that a threshold number of the event bundles in the first event batch have been processed by the first computing group. In response to the determination, a second event batch is provided to each of the computing groups.

19 Claims, 6 Drawing Sheets

DETERMINISTIC DATA PROCESSING

CROSS-REFERENCE TO RELATED APPLICATIONS

This application claims the benefit under 35 U.S.C. §119(e) of U.S. Patent Application No. 61/507,849, entitled "Deterministic Data Processing," filed Jul. 14, 2011, which is incorporated herein by reference in its entirety.

BACKGROUND

This specification relates to data processing.

Data is often processed in a distributed computing environment. For example, one set of computing devices may be used to perform a first set of operations on a set of data, while another set of computing devices may be used to perform a second set of operations on the dataset. In some situations, the second set of operations may use results of the first set of operations as input, such that the first set of operations may need to be completed prior to performance of the second set of operations. In distributed computing environments, different computing devices may operate asynchronously relative to the other computing devices, and the different computing devices may have different processing capabilities. Thus, it can be difficult to deterministically process a set of data in a distributed computing environment.

SUMMARY

In general, one innovative aspect of the subject matter described in this specification can be embodied in methods that include the actions of receiving event data specifying a set of events that have occurred, the set of events including advertising impressions and user interactions with advertisements, the event data for each event including a timestamp indicative of a time at which the event occurred; assigning the events to event bundles based on the timestamps, each event bundle containing events having timestamps that are within a pre-specified period of time; creating event batches, each event batch including a pre-specified number of event bundles; providing a first event batch to a first computing group and a second computing group, each computing group including one or more data processing apparatus, the first computing group being a computing group that is configured to perform operations of a first processing stage, the second computing group being a computing group that is configured to perform operations of a second processing stage; determining that a threshold number of the event bundles in the first event batch have been processed by the first computing group; and in response to the determination, providing a second event batch to each of the computing groups. Other embodiments of this aspect include corresponding systems, apparatus, and computer programs, configured to perform the actions of the methods, encoded on computer storage devices.

These and other embodiments can each optionally include one or more of the following features. Methods can further include the actions of determining that a threshold number of event bundles in the second event batch have been processed by the first computing group; determining that the threshold number of event bundles in the first event batch have been processed by the second computing group; and in response to determining that the first computing group has processed at least the threshold number of event bundles in the second event batch and that the second computing group has processed at least the threshold number of event bundles in the first event batch, providing a third event batch to each of the first computing group, the second computing group, and a third computing group, the third computing group being configured to perform operations of a third processing stage.

Operations of the second processing stage can include operations that are performed on first result data from the first processing stage, the first result data being data that are output as a result of the first processing stage; and operations of the third processing stage comprise operations that are performed on second result data from the second processing stage, the second result data being data that are output as a result of the second processing stage.

Determining that a threshold number of event bundles in the first event batch have been processed by the first computing group can include the actions of determining that all of the event bundles in the first event batch have been processed by the first computing group; and determining that a first result from the first processing stage is available to be processed by the second computing group.

Assigning the events to event bundles can include the actions of identifying a first set of events having timestamps specifying times that are in a first pre-specified period; grouping the first set of events to a first event bundle, the first event bundle having a first event bundle identifier; identifying a second set of events having timestamps specifying times that are in a second pre-specified period; and grouping the second set of events to a second event bundle, the second event bundle having a second event bundle identifier having at least one different character than the first event bundle identifier.

The first pre-specified period and the second pre-specified period can be temporally adjacent periods that have a matching or same duration. Creating event batches can include creating event batches in which two or more of the event batches include a same number of event bundles.

Methods can further include the actions of receiving, by the first computing group that performs operations of a first processing stage, the first event batch; processing event data for the events that belong to first event batch; determining that processing of the first event batch has been completed; and logging first results of the first processing stage to a data store. Determining that processing of the first batch has been completed can include the action of determining that a threshold number of event bundles from the first batch has been processed.

Methods can further include the actions of receiving, by a second computing group that performs operations of a second processing stage, the first event batch; preventing the first event batch from being processed by the second computing group until the first results have been logged; determining that the first results have been logged; and processing the first results and event data for the events that belong to the first event batch, the processing including performing the operations of the second processing stage; and logging second results of the second processing stage.

In general, another aspect of the subject matter described in this specification can be embodied in methods that include the actions of receiving, by a first computing group, a first event batch, the first event batch including a pre-specified number of event bundles, each of the event bundles including event data specifying events that occurred during a pre-defined and bounded period of time, the events including user interactions with advertisements that were presented with a plurality of resources, the event data specifying, for each event, a time at which the event is considered to have occurred; determining, for each of the resources, a total number of the user interactions that occurred during the period of time; determining that a threshold number of user interactions is exceeded by the total number of user interactions for each resource in a first set of resources, the first set of resources including one or more of the plurality of resources; classifying a first set of the user interactions as invalid interactions, the first set of user interactions being user interactions with the advertisements that were presented with the first set of resources; determining, for each resource in the first set of resources, an updated total number of user interactions, the updated total number of user interactions for the resource being based on the user interactions that were not classified as invalid user interactions; determining that each of the event bundles in the first event batch has been processed by the first computing group; and enabling a second computing group to process the user interactions that have not been classified as invalid user interactions. Other embodiments of this aspect include corresponding systems, apparatus, and computer programs, configured to perform the actions of the methods, encoded on computer storage devices.

These and other embodiments can each optionally include one or more of the following features. Methods can further include the actions of determining, for each of the resources and by the second computing group, an interaction rate that is based on a number of user interactions that have not been classified as invalid user interactions relative to the period of time; determining that an interaction rate threshold is exceeded by the interaction rate for each resource in a second set of resources; and classifying one or more of the user interactions with the advertisements that were presented with the second set of resources as an invalid user interaction.

Methods can further include the actions of determining updated interaction rates for the second set of resources, the updated interaction rate for each resource in the second set of resources being based on the user interactions that have not been classified as invalid user interactions; and enabling a third computing group to process the user interactions that have not been classified as invalid user interactions.

Classifying a first set of the user interactions as invalid interactions can include the actions of determining that a threshold number of user interactions in the first set of user interactions were initiated by a same user device and within a threshold time period; and classifying the one or more of the events as invalid events based on the determination.

Classifying a first set of the user interactions as invalid interactions can include determining that at least one user interaction in the first set of user interactions was initiated by a user device that is included in a blacklist of entities that have been previously identified as initiating invalid events; and classifying the at least one user interaction as an invalid event based on the determination.

Methods can further include the actions of providing data identifying the invalid user interactions to another data processing apparatus for further analysis. Enabling a second computing group to process the user interactions that have not been classified as invalid events can include, setting a data flag to indicate that the first event batch has been processed by the first computing group.

Methods can further include the actions of storing the user interactions in the first set of user interactions with data identifying the user interactions in the set of user interactions as invalid events.

Particular embodiments of the subject matter described in this specification can be implemented so as to realize one or more of the following advantages. A same set of results can be obtained over multiple processing cycles by grouping data in a manner that ensures that the same data will again be grouped together, even if grouped by a different data processing apparatus. The accuracy with which a data processing apparatus detects invalid events can be increased by ensuring that each stage of a processing cycle is processing a same set of event data. Deterministic data processing is achieved in a distributed (or parallel) computing environment by ensuring that each computing group in each processing cycle (e.g., a set of processing stages) completely processes a particular event batch (or processes at least a threshold number of event bundles in the particular event batch) before proceeding to a next processing cycle.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
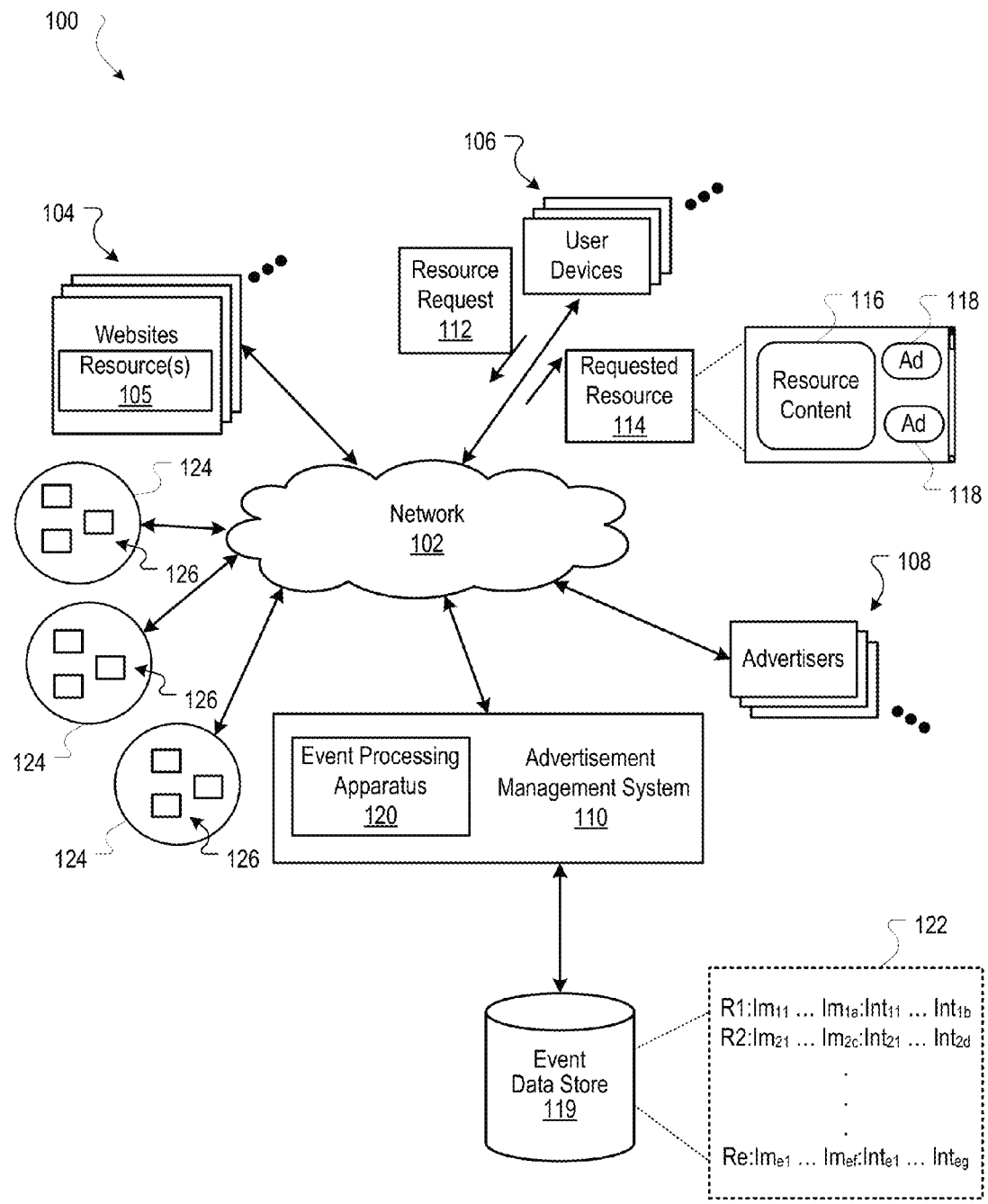
FIG. 1 is a block diagram of an example environment in which an advertisement management system manages advertising services.

Deterministic processing refers to processing that produces a matching result (e.g., a same result) even if the processing is repeated by a same or different data processing apparatus. Deterministic processing of events in a distributed (or parallel) computing environment is achieved by creating batches of events based on timestamps (e.g., indicative of a time at which the event occurred) associated with the events, and specifying operations that must occur in order for processing of the events to continue at a next processing stage. The events can include, for example, impressions for (e.g., presentations of) advertisements (or other content) that has been distributed in an online environment. The events can also include user interactions (e.g., user mouse clicks, touch-screen taps, or other user interactions) with the advertisements. The events are represented by event data.

In some implementations, the events are assigned to event bundles based on their timestamps, such that each event bundle includes events that occurred within a pre-specified and/or bounded time period (e.g., a two minute window of time) and different bundles include events that occurred during different time periods. The event bundles can further be grouped to event batches, where each event batch can include a same number of event bundles (or pre-specified numbers of event bundles that may not be the same). In turn, the event batches can be provided to computing groups (e.g., a set of one or more computing devices), where each computing group can perform operations of a different processing stage. A first processing stage may be performed on event data for the events in the first event batch, while a second processing stage may be performed on results of the first processing stage (and/or the event data). As described in more detail below, the second processing stage can be prevented from being performed until the first processing stage has been completed so that the results of the first processing stage are not incomplete.

For example, the second processing stage can be prevented from occurring until the pre-specified number of event bundles has been processed by the first processing stage.

The description that follows describes processing event data representing impressions of advertisements, user interactions with advertisements that are distributed in an online environment, and conversions that may occur following user interaction with the advertisement. A conversion is a user action (e.g., submission of a completed form or completing a sales transaction) that has been specified to constitute a conversion. In some implementations, a separate processing pipeline (e.g., a system that performs a set of processing stages and/or processing cycles) can be used to process each of the different types of events. For example, assume that one processing pipeline is used to process and analyze impression data, while another processing pipeline is used to process and analyze interaction data, and yet another processing pipeline is used to process conversion data. In this example, a separate data processing apparatus can be used to group each of the different types of data for each of the separate processing pipelines. For purposes of clarity, the description that follows describes only a single event processing apparatus 120 that groups event data for a single processing pipeline. As described in more detail below, the processing of the event data facilitates detection of invalid advertisements impressions, invalid user interactions, and/or invalid conversions (collectively referred to as invalid events). The systems, devices, and methods described below can also be used to process other types of data.

FIG. 1 is a block diagram of an example environment 100 in which an advertisement management system 110 manages advertising services. The example environment 100 includes a network 102, such as a local area network (LAN), a wide area network (WAN), the Internet, or a combination thereof. The network 102 connects websites 104, user devices 106, advertisers 108, and the advertisement management system 110. The example environment 100 may include many thousands of websites 104, user devices 106, and advertisers 108.

A website 104 is one or more resources 105 associated with a domain name and hosted by one or more servers. An example website is a collection of web pages formatted in hypertext markup language (HTML) that can contain text, images, multimedia content, and programming elements, such as scripts. Each website 104 is maintained by a publisher, which is an entity that controls, manages and/or owns the website 104.

A resource 105 is any data that can be provided over the network 102. A resource 105 is identified by a resource address that is associated with the resource 105. Resources include HTML pages, word processing documents, and portable document format (PDF) documents, images, video, and feed sources, to name only a few. The resources can include content, such as words, phrases, images and sounds, that may include embedded information (such as meta-information in hyperlinks) and/or embedded instructions (such as JavaScript scripts). Units of content that are presented in (or with) resources are referred to as content items.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, such as a web browser, to facilitate the sending and receiving of data over the network 102.

A user device 106 can submit a resource request 112 that requests a resource 105 from a website 104. In turn, data representing the requested resource 114 can be provided to the user device 106 for presentation by the user device 106. The requested resource 114 can be, for example, a home page of a website 104, a search results page in which search results are presented, or another resource 105. The data representing the requested resource 114 can include data that cause presentation of resource content 116 at the user device. The data representing the requested resource 114 can also include data specifying a portion of the resource or a portion of a user display (e.g., a presentation location of a pop-up window or in a slot of a web page) in which advertisements can be presented. These specified portions of the resource or user display are referred to as advertisement slots 118.

When a resource 105 is requested by a user device 106, the advertisement management system 110 receives a request for advertisements to be provided with the requested resource 114. The request for advertisements can include characteristics of the advertisement slots that are defined for the requested resource 114, and can be provided to the advertisement management system 110.

For example, a reference (e.g., URL) to the requested resource 114 for which the advertisement slot is defined, a size of the advertisement slot, and/or media types that are eligible for presentation in the advertisement slot can be provided to the advertisement management system 110. Similarly, keywords associated with a requested resource ("resource keywords") can also be provided to the advertisement management system 110 to facilitate identification of advertisements that are relevant to the requested resource 114.

Based on data included in the request for advertisements, the advertisement management system 110 selects advertisements that are eligible to be provided in response to the request ("eligible advertisements"). For example, eligible advertisements can include advertisements having characteristics matching the characteristics of the advertisement slots 118 and that are identified as relevant to specified resource keywords. In some implementations, advertisements having targeting keywords that match the resource keywords are selected as eligible advertisements by the advertisement management system 110. The eligible advertisements can also include advertisements for advertisers that have entered into an agreement with the publisher of a website 104 (or another resource) to have their advertisements presented with the website 104 at least a minimum number of times.

The amount that is paid by an advertiser for presentation of its advertisement can be based, for example, on a number of impressions that the advertiser's advertisements receive. For example, an advertiser can pay a specified amount for every 1000 impressions, which is referred to as a cost per mille (CPM) price. The amount paid by the advertiser can also be based, at least in part, on a number of user interactions with the advertisement. For example, an advertiser can pay a specified amount for each user interaction with its advertisement, which is referred to as a cost-per-click (CPC) price. Other pricing techniques such as cost per action or cost per conversion can also be used to determine the price that will be paid by an advertiser.

Many of the pricing techniques that are used to determine the price that will be paid by an advertiser (and paid to the publisher) are based, at least in part, on a number of impressions that an advertisement receives and/or a number of user interactions with the advertisement. Therefore, it is important to accurately track the number of impressions and user interactions with the advertisements. The advertisement management system 110 can track the number of impressions and the number of user interactions with advertisements by storing event data 122 indicative of the impressions and user interactions in an event data store 119. Impressions, conversions, and user interactions are collectively referred to as events, and each individual impression, conversion, or user interaction can be considered a separate event. Events are not limited to impressions, conversions, or user interactions, and can be any tracked event.

The event data 122 stored in the event data store 119 include impression data (e.g., $Im_{11}$-$Im_{1a}$, $Im_{21}$-$Im_{2c}$, and $Im_{e1}$-$Im_{ef}$) that are indicative of advertisement impressions that have occurred. The event data 122 can also include interaction data (e.g., $Int_{11}$-$Int_{1b}$, $Int_{21}$-$Int_{2d}$, and $Int_{e1}$-$Int_{eg}$) that are indicative of the occurrence of user interactions with the advertisements. The event data 122 can further include conversion data (not shown) that are indicative of the occurrence of a user action that constitutes a conversion (e.g., completion of a sales transaction or submitting a completed form). In some implementations, each different type of event data can be stored in a separate event log. For example, impression data can be stored in an impression log, while interaction data and conversion data can be respectively stored in an interaction log and a conversion log. Each of these different types of data logs can be stored in the event data store 119 and processed using a separate processing pipeline (e.g., a different set of data processing apparatus). Each of the respective data logs (e.g., the impression log, the interaction log, and the conversion log) can include events that are stored in multiple files.

The event data 122 can be associated with (e.g., indexed according to and/or stored with a reference to) the advertisement for which the event occurred and/or a resource (e.g., R1-Re) with which the advertisement was presented. For example, as illustrated in FIG. 1 the event data 122 that are associated with the resource R1 include the impression data $Im_{11}$-$Im_{1a}$ and the interaction data $Int_{11}$-$Int_{1b}$.

The event data 122 for each event also includes a timestamp that specifies a time at which the event was identified as having occurred. For example, the timestamp for an impression can specify a time at which an advertisement (or other content item) was transmitted to a user device or a time at which data are received indicating that the advertisement was successfully rendered at a user device. The timestamp for a user interaction can be, for example, the time at which the interaction data was generated (e.g., when the user clicked the advertisement) or the time at which the interaction data was received by the advertisement management system 110. As described in more detail below, the timestamps for the events can be used to group events for further processing. For example, events having a timestamp that specifies a time that is within a specified period can all be grouped together for processing even if the event data are not stored in the event data store 119 in order of their timestamps (e.g., due to different latencies through different logging paths in a parallel or distributed computing environment).

In some implementations, the event data 122 could be labeled with data other than a timestamp, and this other data could be used to group the events. For example, if each event that is detected is numbered using a consistently increasing sequence of numbers (or other characters), these numbers could be used to bundle the events in a manner similar to that described below.

As described above, the events for each advertisement can be used, in part, to determine a price that will be paid by an advertiser for distribution of its advertisements and the compensation that will be paid to a publisher for allowing the advertisement to be presented with its resource. In some implementations, the event data are analyzed to determine whether any of the events are invalid events. An invalid event is an event for which an advertiser will not be charged. Invalid events can include automated repeated requests for a same resource, which may artificially increase the number of impressions that advertisements receive. Invalid events can also include impression data that have been determined to have been generated fraudulently. For example, if an automated system is used to iteratively request one or more same web pages and/or simulate user interactions with advertisements, the events that result may be considered invalid events.

The advertisement management system 110 can utilize data analysis techniques to detect periods in which invalid events may have occurred. The data can be analyzed on a per-publisher basis such that all events that are associated with (e.g., indexed according to and/or stored in association with) resources for a particular publisher are analyzed. The data can also (or alternatively) be analyzed on a per-advertiser basis such that all events for a particular advertiser's advertisements are analyzed.

As represented in FIG. 1, and as described in more detail with reference to FIG. 2, the analysis of the event data may occur over two or more sequential (or non-sequential) processing stages such that results from one processing stage may be used for analysis perform in subsequent processing stages. For example, in one processing stage, the advertisement management system 110 may determine a total number of impressions and/or a total number of user interactions, while in a subsequent (e.g., a next) processing stage, the advertisement management system may use the results output from the first processing stage and/or the event data 122 to generate additional results. In turn, the results output from the second processing stage can be used for additional processing stages (e.g., a third or higher order processing stage).

As used throughout this document the term processing stage refers to a set of operations that are performed on event data. One or more processing stages can be performed in each processing cycle. A processing cycle is a period that can be delineated, for example, based on a number of clock cycles or the completion of a specified set of processing stages (e.g., operations), and can be specified, for example, by an administrator of the advertisement management system 110.

The analysis of the event data 122 may occur in a distributed computing environment such that each of the processing stages (e.g., processing stage 1-z) is performed by an independent computing group 124 (e.g., relative to the other computing groups). Each computing group 124 includes a set of one or more computing devices 126. Each computing group 124 may operate asynchronously relative to each other computing group 124, and each computing device 126 in each of the computing groups 124 may also operate asynchronously relative to the other computing devices 126. Thus, it can be difficult to deterministically process event data across the computing groups 124.

For example, different computing devices or different computing groups may have different processing resources such that the different computing devices and/or computing groups may process the event data in different orders or at different rates. Therefore, a particular computing group may finish processing a particular set of event data prior to another set of event data being completely processed by another computing group. If the particular computing group requires results from the other computing group to process the next set of event data and the next set of event data have not been completely processed by the other computing group, then the results used by the particular computing group may not be valid, which in turn could cause the results of the particular computing group to be invalid if the particular computing group proceeds to process the next set of event data. Even if each computing device was allocated a same amount of processing resources (e.g., in a cloud computing environment), the different computing devices may still complete the processing of the event data at different times, for example, due to latencies imposed by other computing resources and/or network bandwidth limitations.

The environment includes an event processing apparatus 120 that facilitates deterministic processing of event data so that the processing occurs in a predictable manner and with each computing group 124 using the same sets of event data for each processing stage. The event processing apparatus 120 is depicted as being part of the advertisement management system 110, but the event processing apparatus 120 can also be implemented independent of the advertisement management system 110.

As described in more detail below, the event processing apparatus 120 is a data processing apparatus that groups event data into event bundles based on the timestamps for the event data, such that each event bundle that is provided to each computing group 124 includes event data 122 for the same set of events. The event processing apparatus 120 creates one or more event batches using the event bundles. Each event batch includes a pre-specified number of event bundles, such that irrespective of the order in which bundles in a particular batch are processed, the batch is determined to have completed processing of the batch only after the pre-specified number of event bundles has been processed. As described in more detail below, results from a particular processing stage (e.g., from a computing group) may only be stored when processing of the event batch has been completed.

Figure 2:
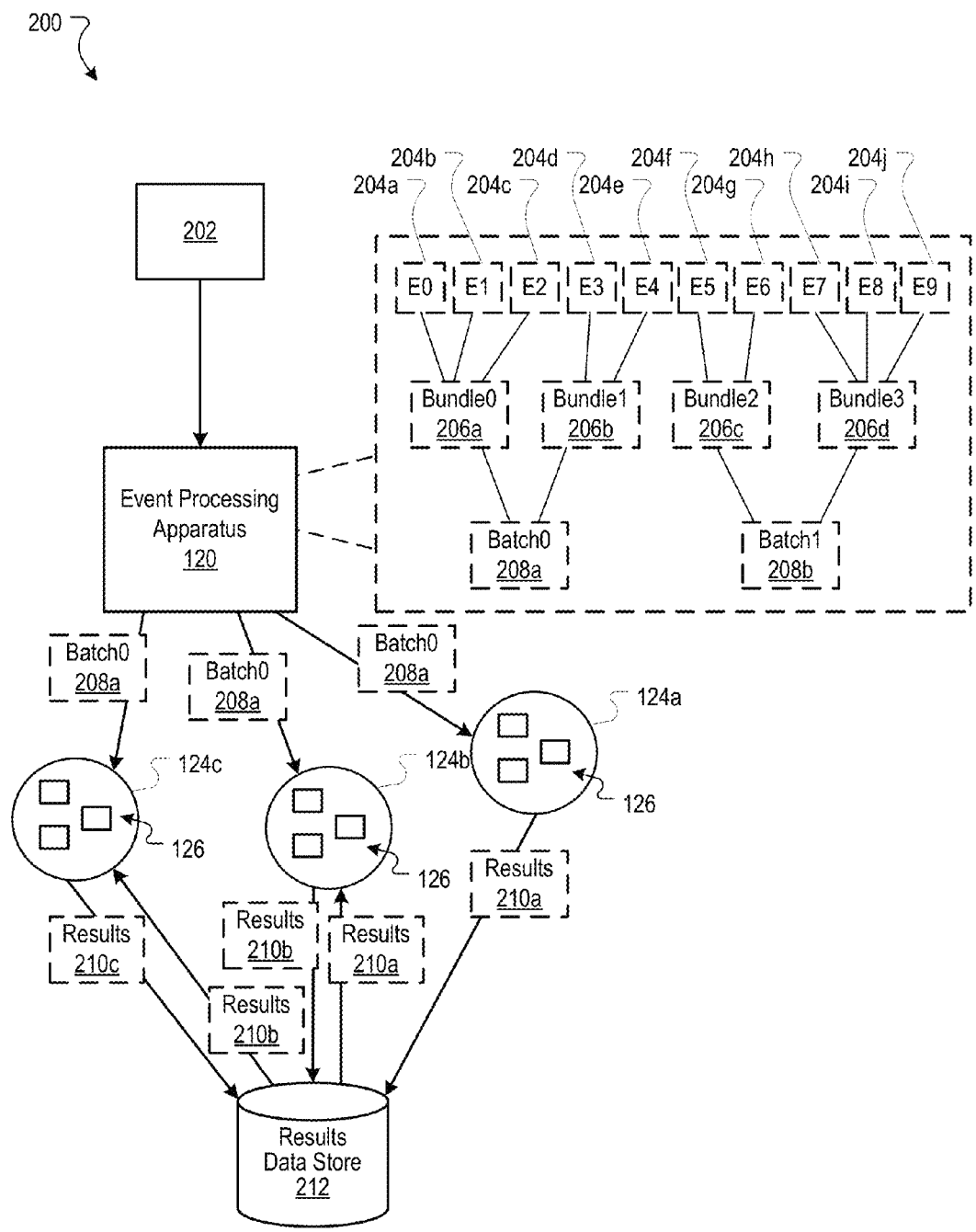
FIG. 2 is a block diagram of an example data flow for processing data in a distributed computing environment.

FIG. 2 is a block diagram of an example data flow 200 for processing data in a distributed computing environment. The data flow 200 begins with the event processing system 120 receives a set of event data 202. The set of event data 202 be received from the event data store 119 of FIG. 1, a memory cache, or from another data processing apparatus. As described above, the set of event data 202 can include impression data, interaction data, conversion data and/or data specifying other types of events for each of a plurality of resources. The event data for each event can include a timestamp, as described above. The terms "event" and "event data" that represent the event are used interchangeably throughout this document. The event processing apparatus 120 can identify the timestamps that are associated with each event, and assign the events to an event bundle based on the timestamps. For example, assume that a new event bundle is created for events that occur during each sequential pre-specified period of time (e.g., every two minutes). Assume further that at time t0 a first event group is created that will include events that occur between the time t0 and the time t1 (e.g., 2 minutes after t0).

In this example, if events E0-E2 204a-204c have timestamps indicating that the events occurred between times t0 and t1, the events E0-E2 204a-204c will be grouped to bundle0 206a, as illustrated by FIG. 2. The next event bundle that is created (e.g., Bundle1 206b) will be used to group event E3 204d and event E4 204e that occurred between time t1 and time t2 (e.g., 2 minutes after t1). Additional bundles (e.g., bundle2 206c and bundle3 206d) can be used to group additional events to event bundles based on the time at which the events occurred. For example, events E5 204f and E6 204g can be grouped to bundle 2 206c, while events E7-E9 204h-204j can be grouped to bundle 3 206d. As illustrated in FIG. 2, the number of events that are grouped to each bundle need not be the same, as each bundle of events includes the events that occurred during the pre-specified period of time.

As noted above, the event data may be stored in many different files (e.g., due to the event data being logged in a parallel or distributed computing environment. In some implementations, a pre-specified number of files may be used to store the event data each day. For example, 8640 files can be used to store the event data for a single day. In this example, each of the files will contain event data for events that occurred during a 30 second period. Thus, a bundle that is generated for a two minute period may include event data from four different files.

In some implementations, the event data are first bundled on a per-file basis, and then a final bundle is created using the bundles that were created for each of the files. When the event data are bundled in this manner, the final bundle for a particular time period can be created by identifying, in each of the files, the bundle in the file that corresponds to the particular time period, and then adding the event data to the final bundle in order of file number. For example, assume that 3 different files (e.g., files named File__1, File__2, and File__3) each include event data that will be included in the bundle for the time period t0-t1. In this example, the bundle from File__1 for this time period will first be added to the final bundle for this time period, while the bundle from File__2 for this time period will be the next bundle added to the final bundle, and the bundle from File__3 for this time period will be the last bundle added to the final bundle for this time period. In some implementations, each of the bundles in each file can be stored with a reference to the file in which the bundle is located and a reference to the time period for the bundle.

Bundling can occur in near real-time (e.g., as events are detected), but some of the events that occurred during the pre-specified period may not be logged until after the end of the pre-specified period (e.g., due to network latencies). Also, the events may not be logged in order of their respective timestamps. Thus, in some implementations, additional events (e.g., events that occurred during the pre-specified period, but were not logged until after the end of the pre-specified period) may continue to be included in the final bundle for a pre-specified period of time following the end of the pre-specified period. This helps ensure that each of the events that occurred during a particular period of time are included in the bundle for that particular period of time.

The event processing apparatus 120 groups event bundles into event batches (e.g., sets of event bundles). In some implementations, each event batch includes a same number of event bundles. For example, as illustrated by FIG. 2, batch0 208a and batch 1 208b each include 2 event bundles. The batches can each include more event bundles than illustrated in FIG. 2. In some implementations, the number of event bundles in each event batch need not be the same, as long as the number of bundles (or the last bundle) in each batch can be determined by the computing groups 124, or the computing groups 124 can otherwise determine that all of the event bundles in the batch have been processed. For example, if each batch included data indicating the number of bundles that was included in the batch, then two different batches could include different numbers of bundles.

The event processing apparatus 120 provides event batches to the computing groups 124 that will process the event data for events that belong to the batches. In some implementations, the event processing system 120 provides the event batches in sequential order of batch number, and each computing group 124 receives the same event batches. For example, the event processing apparatus 120 can first provide batch0 208a to each of the computing groups 124 that will be processing the event data. The event processing apparatus 120 can subsequently provide batch1 208*b* and any other event batches to each of the computing groups 124.

The computing devices 126 that are included in each of the computing groups 124 process the event data for the events that belong to the event batches and provide results of the processing to a results data store 212. As described in more detail below, each of the computing groups 124 may be configured to perform operations of different processing stages. For example, computing group 124*a* may be configured to perform operations of a first processing stage in which first results can be obtained without using the results of another processing stage, while computing group 124*b* may be configured to perform operations of a second processing stage in which second results are obtained based, at least in part, on the first results being processed. Similarly, computing group 124*c* may be configured to perform operations of a third processing stage in which third results are obtained based, at least in part, on the second results being processed. In some implementations, the third results may also be obtained based, in part, on the first results being processed.

When later processing stages (e.g., the second processing stage or the third processing stage) obtain results based, at least in part, on results of previous processing stages (e.g., the first processing stage), the later stages may need access to the results of the previous processing stages. As illustrated by FIG. 2, the first computing group 124*a* can store results 210*a* of the first processing stage (e.g., in the form of results data) in a results data store 212 so that the results 210*a* are accessible by the second computing group 124*b*. Using the results 210*a*, the second processing group 124*b* can generate results 210*b* of the second processing stage and store these results 210*b* in the results data store 212 so that the results can be accessed by the third processing group. Using the results 210*b* (and/or the results 210*a*), the third processing group 124*c* can generate results 210*c* of the third processing stage, and store the results 210*c* in the results data store 212. As described in more detail below, the results from each processing stage can be prevented from being stored in the results data store 212 until all of the events in the event batch have been processed. In some implementations, storing of results to the results data store is not restricted, but later processing stages that perform operations using the results of a previous processing stage can be prevented from reading the results from the results data store 212 until all of the events in the event batch have been processed.

Figure 3:
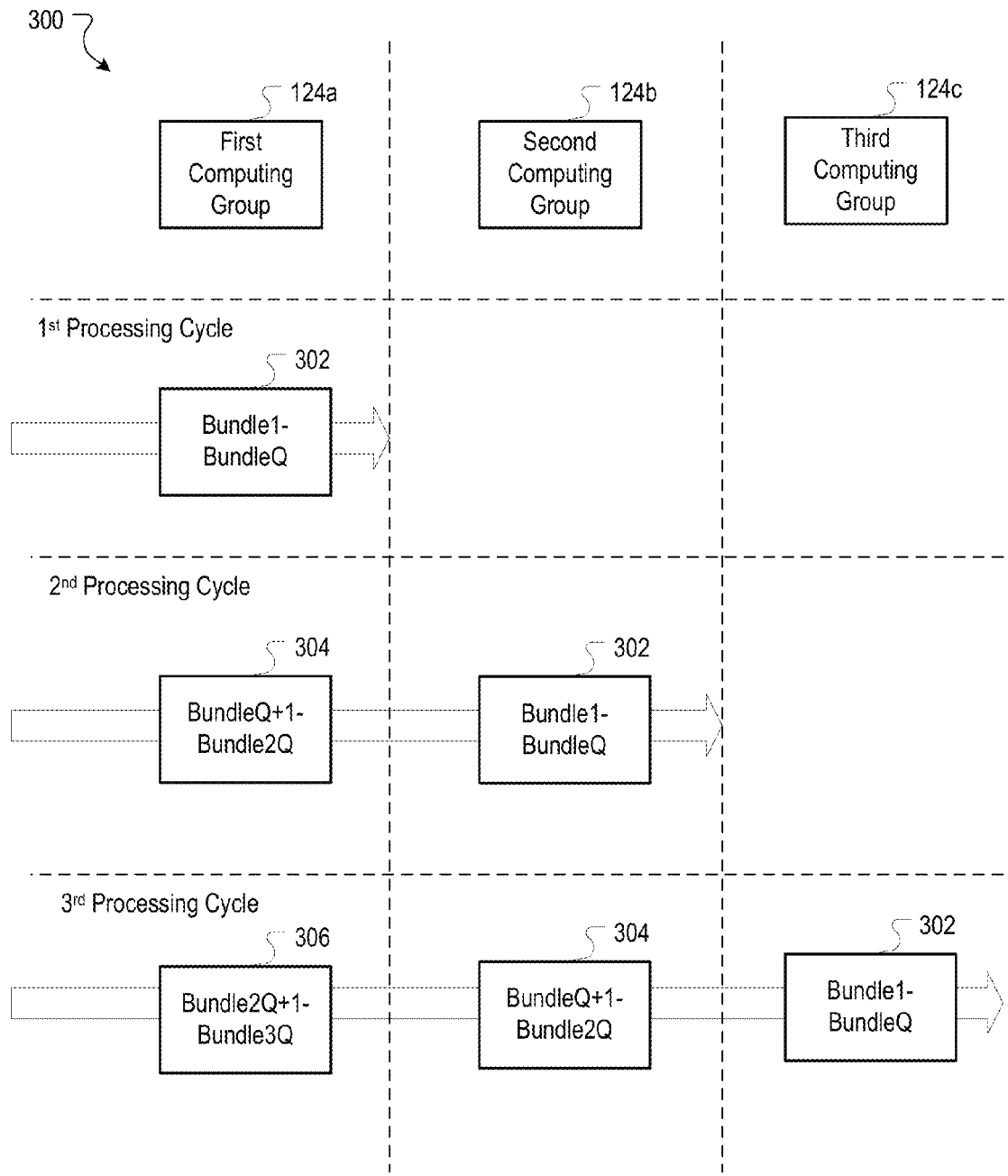
FIG. 3 is a block diagram of an example data flow for processing batches of data over multiple processing stages.

FIG. 3 is a block diagram of an example data flow 300 for processing batches of data over multiple processing stages. The data flow 300 begins at a first processing cycle with a first event batch 302 being processed by a first computing group 124*a* that performs operations of a first processing stage. The first event batch 302 can include a pre-specified number of event bundles. For example, as illustrated by FIG. 3, the first event batch 302 includes Q different event bundles (e.g., Bundles 1-Q).

As described above, the first computing group 124*a* can perform operations of the first processing stage independent of whether result data from a previous processing stage are available. For example, the first computing group 124*a* can perform a set of operations that determine a total number of impressions for an advertisement, a total number of user interactions with the advertisement, or a total number of conversions that occurred following user interaction with the advertisement based, at least in part, on the event data for the events that are in the event first event batch 302.

In some implementations, the first processing stage can include operations that are performed by the first computing group 124*a* to determine whether the first event batch 302 includes one or more invalid events. For example, the first computing group 124*a* can perform the operations of the first processing stage in order to determine whether a change in a total number of events (e.g., impressions, clicks and/or conversions) from one event batch (e.g., event data for events that occurred over a period that begins at a reference time=0 and ends at time=2 minutes) to a second event batch (e.g., event data for events that occurred over a period that begins at time=2 minutes and ends at time=4 minutes) exceeds a first threshold change (e.g., a 200% increase).

If the first computing group 124*a* determines that the threshold change is exceeded, the first event batch 302 can be considered to include invalid events. For example, the likelihood that at least a portion of the change in a total number of events is due to fraudulent activity increases in proportion to the magnitude of the change from one time period to the next (e.g., when the change is normalized to account for periodic seasonal and daily changes). If the first computing group 124*a* determines that the threshold change has not been exceeded, the first computing group 124*a* may determine that the first event batch 302 does not include invalid events. However, results from further processing stages may indicate that the event batch includes invalid events even if the first threshold change is not exceeded. The threshold change can be a value that is selected based on a historical analysis of event data and can account for seasonal variations in event data (and/or other factors) in order to prevent false identification of periods that may include invalid events. An event batch that is determined to include one or more invalid events may be provided to another data processing apparatus for additional analysis and identification of the particular invalid events.

The first computing group can also identify invalid events based on other information that may be represented by the event data. For example, if a list of blacklisted entities has been created, information in the event data, such as the resource at which the event occurred or an identifier that is associated with the user device from which the event was initiated, can be used to determine whether particular events are invalid. For example, if the event is associated with data identifying an agent that has been previously identified as initiating invalid events the event can be considered invalid. In some implementations, events that are initially considered invalid can be further evaluated to confirm whether the event was invalid. For example, a list of invalid events can be provided to another data processing apparatus for further evaluation by additional processing operations or for further evaluation by a human reviewer.

In some implementations, the first computing group 124*a* (and other computing groups) can prevent results from the first processing stage (and other processing stages) from being stored to a results data store 212 until all of the event data in an event batch has been processed. For example, the first computing group can store interim results (e.g., results computed using a proper subset of the event data that are included in the event batch) in a temporary cache and iteratively update the interim results until processing of the event batch has been completed. Once processing of the first event batch 302 has been completed, the final results (e.g., results computed using event data for each of the events that belong to the event batch) can be stored in a results data store 212 that can be accessed by other computing groups at which other processing stages are performed.

In some implementations, the interim results can be stored in the results data store 212 (e.g., instead of a temporary cache) and the other computing groups can be prevented from reading the interim data until processing of the event batch has been completed. For example, a data flag can be set (or cleared) when processing of the event batch has been completed, which can indicate that the results are available to be read by the other computing groups.

In some implementations, the first computing group 124a (and other computing groups) can compare the number of processed event bundles to the pre-specified number of event bundles that are included in each event batch. When the number of processed event bundles meets the pre-specified number of bundles (or a specified portion thereof), the first computing group 124a can determine that the event batch has been completely processed.

As illustrated by FIG. 3, during the first processing cycle, the first event batch 302 may not be processed by the second computing group 124b and/or the third computing group 124c. For example, the second processing stage and/or the third processing stage that are respectively performed by the second computing group 124b and the third computing group 124c may require result from the first processing stage in order to process the first event batch 302.

The first event batch 302 may be provided to the second computing group 124b and/or the third computing group 124c at the start of the first processing cycle and cached until the processing cycle in which the first event batch 302 will be processed. For example, the second computing group 124b can receive the first event batch 302 during the first processing cycle and store the first event batch 302 in cache until the second processing cycle, which is when the first event batch 302 will be processed by the second computing group.

Alternatively, the first event batch 302 can be provided to each computing group only for the processing cycle during which the computing group will be processing the first event batch 302. For example, in some implementations, the first event batch 302 may only be provided to the second computing group 124b during the second processing cycle, while the first event batch 302 is only provided to the third computing group during the third processing cycle. The description that follows describes each event batch being broadcast to each of the computing groups at the same time.

The data flow 300 can continue to a second processing cycle in which the first event bundle 302 is processed by a second computing group 124b that performs operations of a second processing stage. As described above, the second computing group 124b can perform operations of the second processing stage using the first event batch 302 alone or in combination with first results generated by processing the first event batch 302 according to the first processing stage and/or second results generated by processing the first event batch 302 according to the second processing stage.

The data flow 300 can continue to a second processing cycle in which a second event batch 304 is processed by the first computing group 124b. The second event batch 304 can be processed in a manner similar to the manner by which the first event batch 302 was processed by the first computing group 124a. For example, the first computing group 124 can determine a total number of impressions, a total number of user interactions, and/or a total number of conversions that are specified by the second event batch 304. The second event batch can also include the pre-specified number of event bundles. For example, as illustrated by FIG. 2, the second event batch 304 includes Q event bundles (e.g., Bundles Q+1–2Q), which is the same number of event bundles that were included in the first event batch.

During the second event cycle, the first event batch 302 is processed by a second computing group 124b that performs operations of a second processing stage. As described above, the second computing group 124b can perform operations of the second processing stage using the first results from the first processing stage and/or the event data. For example, the second computing group 124b can perform a set of operations that determine an interaction rate (e.g., total number of user interactions/total number of impressions) using the total number of user interactions and the total number of impressions that were determined during the first processing stage.

In some implementations, the second processing stage can include operations that are used by the second computing group 124b to determine whether the first event batch 302 includes one or more invalid events. For example, the second computing group 124b can perform the operations of the second processing stage in order to determine whether the interaction rate for the first event batch 302 exceeds a threshold interaction rate. The threshold interaction rate can be an absolute value (e.g., 95%) above which an event batch is presumed to include one or more invalid events. Alternatively, the threshold interaction rate can be a relative interaction rate measured with reference to the interaction rate for one or more previous event batches. For example, the threshold interaction rate can be specified as 200% of the interaction rate for the most recently processed event batch If the second computing group 124b determines that the interaction rate exceeds the threshold interaction rate, the first event batch 302 can be considered to include invalid events. If the second computing group 124b determines that the interaction rate does not exceed the threshold interaction rate, the second computing group 124b may determine that the first event batch 302 does not include invalid events. However, results from further processing stages may indicate that the event batch includes invalid events even if the interaction threshold is not exceeded.

In some implementations, the second computing group 124b (and other computing groups) can prevent results from the second processing stage (and other processing stages) from being stored to a results data store 212 until all of the event data in an event batch has been processed. For example, the second computing group 124b can store interim results (e.g., results computed using a proper subset of the event data that are included in the event batch) in a temporary cache and iteratively update the interim results until processing of the event batch has been completed. Once processing of the event batch has been completed, the final results (e.g., results computed using event data for each of the events that belong to the event batch) can be stored in a results data store 212 that can be accessed by other computing groups at which other processing stages are performed. As illustrated by FIG. 3, during the second processing cycle, the first event batch 302 may not be processed by the third computing group 124c.

In some implementations, the interim results can be stored in the results data store 212 (e.g., instead of a temporary cache) and the other computing groups can be prevented from reading the interim data until processing of the event batch has been completed. For example, a data flag can be set (or cleared) when processing of the event batch has been completed, which can indicate that the results are available to be read by the other computing groups.

The data flow 300 can continue to a third processing cycle in which the first event bundle 302 is processed by a third computing group 124c that performs operations of a third processing stage. The third computing group 124c can perform operations of the third processing stage using the first event batch 302 alone or in combination with first results generated by processing the first event batch 302 according to the first processing stage and/or second results generated by processing the first event batch 302 according to the second processing stage.

For example, the third computing group 124c can generate a histogram for each of the resources for which event data have been received (and/or each entity that performed the event). The histogram can specify, for example, a frequency with which statistical measures of events occur. Multiple histograms can be used to compare statistical measures for events that occur over a specified time period relative to the statistical measures over one or more previous time periods. If the comparison reveals that the histograms differ more than a threshold amount, this can be an indication that invalid events occurred during the specified time period. In turn, the output of the third computing group can include data specifying whether the event data include invalid events and/or the events that have been identified as invalid (e.g., events that have been identified as being initiated by a particular device or group of devices). The output of the third computing group 124c can be stored as results of the second processing stage, and stored in a results data store, as described above.

The third computing group 124c can also consider combinations of results from the first, second, and/or third processing stages in order to determine whether the combined results indicate that the first event batch 302 includes invalid events. If the first event batch 302 is determined to include one or more invalid events, the first event batch 302 can be provided to another data processing apparatus for additional analysis and identification of the particular invalid events.

During the third processing cycle, a third event batch 306 can also be processed by the first computing group 124a that performs operations of the first processing stage, while the second event batch 304 is processed by the second computing group 124b, as described above. The third event batch 306 can include a pre-specified number of event bundles. For example, as illustrated by FIG. 3, the third event batch 306 includes Q different event bundles (e.g., bundle 2Q+1–3Q), which is the same number of event bundles as the first event batch 302 and the second event batch 304. The first computing group 124a can process the third event batch 306 in a manner similar to the manner by which the first event batch 302 was processed by the first computing group 124a, as described above. The second computing group 124b can process the second event batch 304 in a manner similar to the manner by which the first event batch 302 was processed by the second computing group 124b, as described above. The data flow 300 can continue in the manner described above so that additional event batches can be processed by each of the computing groups over subsequent processing cycles.

Figure 4:
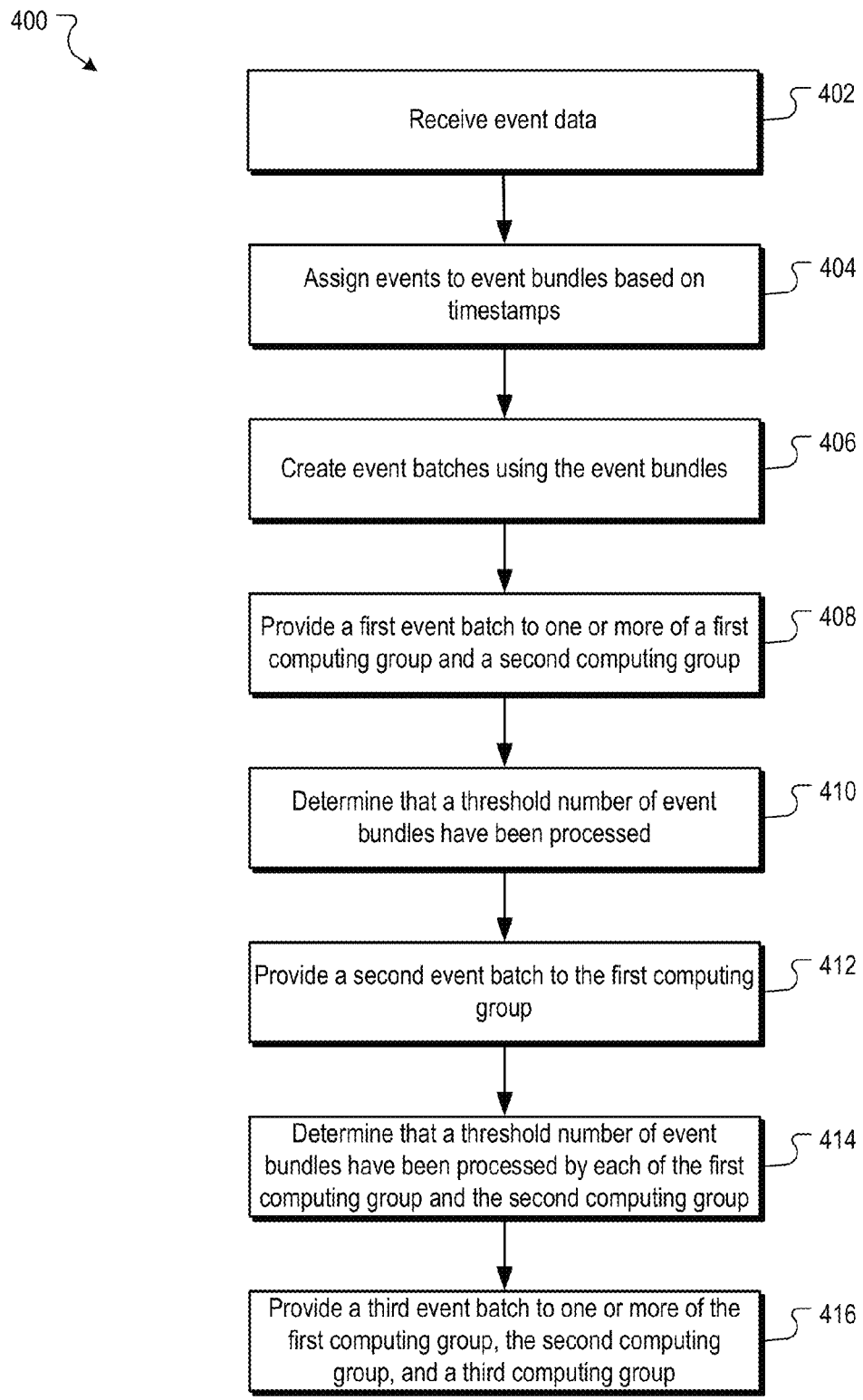
FIG. 4 is a flow chart of an example process for processing batches of data in a distributed computing environment.

FIG. 4 is a flow chart of an example process 400 for processing batches of data in a distributed computing environment. The process 400 facilitates deterministic processing of event data such that different groups of computing devices (e.g., computing groups) can each receive and process a same set of event data irrespective of whether the sets of event data were provided by the same computing device and/or at the same time. For example, by grouping events into event bundles based on timestamps that are included in the event data for the events the events that are included in a particular event will not vary based on the processing resources of the particular computing device that is bundling the events into groups. Additionally, by grouping a pre-specified number of event bundles into each event batch, each different computing group that receives a particular event batch can determine when the entire event batch has been processed based on the number of event bundles that have been processed. In turn, each different group of computing devices can prevent result data for a particular event batch from being logged until processing of the particular event batch has been completed.

The process 400 can be implemented, for example, using the event processing apparatus 120 and/or advertisement management system 110 of FIG. 1. The process 400 can also be implemented as instructions stored on computer storage medium such that execution of the instructions by data processing apparatus cause the data processing apparatus to perform the operations of the process 400.

Event data are received (402). The event data are data that specify the occurrence of a set of events. In some implementations, the set of events include advertising impressions and user interactions with advertisements. For example, the event data that are received over a particular time period can include data indicative of each impression that each advertisement has received during the particular time period. As described above, the event data can further specify a timestamp that is indicative of a time at which the event occurred.

The events are assigned to event bundles based on the timestamps (404). In some implementations, each event bundle contains events having timestamps that are within a pre-specified period of time. For example, the events that are assigned to a particular event bundle can be events having timestamps that specify a time that is within a period that begins at t0 and ends at t1 (e.g., a time that is 2 minutes after t0.)

In some implementations, an event bundle is created for each temporally adjacent period of time, and each temporally adjacent period of time can have a matching duration. For example, assume that a first event bundle is created for events that occur (e.g., based on the timestamps) during a first two minute period (e.g., a period from time t0 to time t1), and a second event bundle is created for a second two minute period that is temporally adjacent to the first two minute period (e.g., a period from t1-t2). In this example, a first set of events having timestamps specifying times that are in the first two minute period (e.g., between t0 and t1) can be grouped together in the first event bundle. Similarly, a second set of events having timestamps specifying times that are in the second two minute period can be grouped together in the second event bundle.

In the example above, the duration of each period matched because the duration of each period was the same (e.g., 2 minutes). The duration of two periods can also match even if the durations are not exactly the same. For example, due to processing speeds and/or clock variation, the duration of different periods may differ. In some implementations, differing durations can be matching durations as long as the difference between the durations is within a pre-specified duration threshold. The pre-specified duration threshold is a value indicative of a maximum difference that can exist between two durations for the durations to be considered matching durations. For example, if the duration threshold is 0.5 seconds, a duration of 30 seconds and a duration of 30.3 seconds will be considered matching durations.

In some implementation, each event bundle is assigned a bundle identifier that is indicative of the period of time during which the events in the event bundle occurred. Continuing with the example above, the first event bundle may be assigned the bundle identifier of 0, while the second event bundle may be assigned the bundle identifier of 1. Based on these bundle identifiers computing groups can determine that the events in the event bundle 0 occurred prior to the events in the event bundle 1. Each bundle identifier should contain at least one different character than the other event bundles so that each event bundle is distinguishable from other event bundles.

Event batches are created (406). In some implementations, each event batch includes a pre-specified number of event bundles. For example, each event batch can include a same number of event bundles (e.g., 20 event bundles). In this example, event bundles 0-19 may be included in a first event batch, while event bundles 20-39 may be included in a second event batch. Creating each event batch to include a same number of bundles facilitates deterministic processing of the event data. For example, each computing group can determine that the event batch has been completely processed after the pre-specified number of event bundles (e.g., 20 event bundles) has been processed.

A first event batch is provided to a first computing group and/or a second computing group (408). The first event batch can also be provided to a second computing group if event batches are being broadcast to the computing groups. If event batches are only being provided to computing groups during the processing cycle during which the event batch will be processed, the second computing group may not initially receive the first event batch. For example, if the first event batch will not be processed by the second computing group until a second computing cycle, then the first event batch may not be provided to the second computing group until the second computing cycle. The description that follows assumes that the event batches are being broadcast to the computing groups at the same time irrespective of when the computing group will process the event batch in a current processing cycle. Therefore, in the examples below, the first event batch is assumed to have also been provided to the second computing group during step 408 of the process 400.

In some implementations, each computing group includes one or more data processing apparatus (e.g., computing devices). The first computing group is a computing group configured to perform operations of a first processing stage. As described above, the operations of the first processing stage can be performed irrespective of whether result data from other processing stages are available. For example, the first processing stage may be a processing stage that does not require result data from another processing stage and/or only requires the event data to be provided as input.

The second computing group is a computing group configured to perform operations of a second processing stage. In some implementations, the operations of the second processing stage comprise operations that are performed on first result data from the first processing stage. The first result data are data output as a result of the first processing stage being performed, at least in part, on the event data. For example, as described above, the second processing stage can be a processing stage in which an interaction rate for advertisements is determined based on a total number of user interactions with the advertisements and a total number of impressions for the advertisements. The total number of impressions and the total number of user interactions may have been determined during the first processing stage.

In some implementations, the first event batch is also provided to a third computing group that is configured to perform operations of a third processing stage. Operations of the third processing stage can include operations that are performed on second result data from the second processing stage. The second result data are data output as a result of the second processing stage. For example, the third processing stage can be a processing stage in which an average interaction rate is computed using the interaction rate for the current event batch (as computed during the second processing stage) and previous interaction rates that were previously determined.

A determination is made that a threshold number of the event bundles in the first event batch have been processed by one or more of the computing groups (410). The determination that the threshold number of bundles have been processed can be used, for example, as an indication that another event batch can be processed by the first computing group (or other computing groups). The threshold number of event bundles can be set to a value equal to a total number of event bundles that are included in the first event batch, such that the first computing group is required to complete processing of the first event batch in order for the determination to be made. The threshold number of event bundles may alternatively be set to a value that is less than the total number of event bundles. In some implementations, the determination requires that all (or a proper subset) of the computing groups have processed at least the threshold number of events bundles.

In some implementations, the threshold number of event bundles can be determined to have been processed based on data received from the first computing group (and/or other computing groups) to which the first event batch was provided. For example, the first computing group (and/or other computing groups) may determine that it has processed all of the event bundles in the first event batch and submit a request for the second event batch. The request can include data, such as a data flag, indicating that the first event batch has been processed by the first computing group (and/or the other computing groups). The first computing group (and/or other computing groups) can determine that it has processed the threshold number of event bundles, for example, by comparing the number of event bundles that have been processed by the first computing group (and/or the other computing groups) to a total number of event bundles in the event batch.

For example, if each event batch includes a same total number of event bundles (e.g., 20 event bundles), the first computing group can monitor the number of event bundle that have been processed, and compare that number to the total number of event bundles in the event batch (e.g., 20 event bundles). When the number of event bundles that have been processed equals the total number of event bundles for the event batch, the first computing group can make the determination that the event batch has been completely processed.

Alternatively, or additionally, the determination that the threshold number of event bundles has been processed can be determined based on result data for the event batch being stored in the results data store. As described above, each computing group can prevent result data from being stored in the results data store until all of the event bundles in the event batch have been processed by the computing group. Thus, if the result data for a particular event batch is stored in the results data store and available to be processed by the second computing group, the event batch can be considered to have been completely processed, such that the determination can be made that the threshold number of event bundles has been processed.

A second event batch is provided to one or more of the computing groups in response to determining that the threshold number of event bundles in the first event batch has been processed (412). For example, the second event batch can be provided to only those computing groups that will process the event batch during a current event cycle (e.g., the first computing group). Alternatively, the second event batch can be provided to all (or a proper subset) of the computing groups.

A determination is made that a threshold number of event bundles in the second event batch have been processed by the first computing group and that a threshold number of event bundles in the first event batch have been processed by the second computing group (414). The determination that the threshold number event bundles have been processed can be determined in a manner similar to that described above.

A third event batch is provided to one or more of the first computing group, the second computing group, and a third computing group (416). In some implementations, the third event batch is provided in response to determining that the first computing group has processed at least a threshold number of event bundles in the second event batch and that the second computing group has processed at least a threshold number of event bundles in the first event batch. Additional event batches can continue to be iteratively provided in response to the determination that one or more of the previously provided event batches has been processed.

Figure 5:
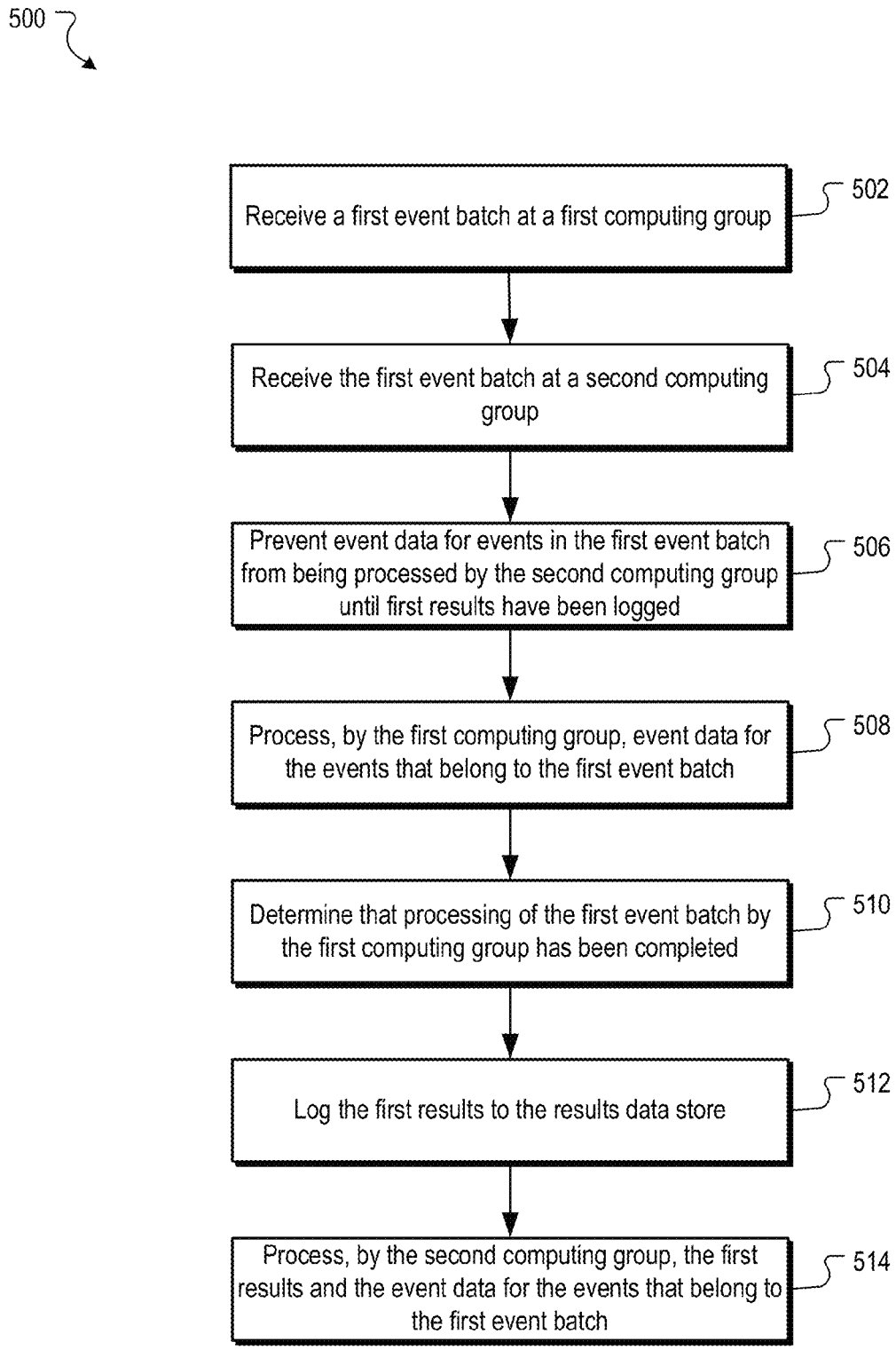
FIG. 5 is a flow chart of an example process for deterministically processing event data.

FIG. 5 is a flow chart of an example process for deterministically processing event data. The process 500 can be implemented, for example, using the event processing apparatus 120 and/or advertisement management system 110 of FIG. 1. The process 500 can also be implemented as instructions stored on computer storage medium such that execution of the instructions by data processing apparatus cause the data processing apparatus to perform the operations of the process 500.

A first computing group receives the first event batch (502). The first computing group is configured to perform operations of a first processing stage. The operations of the first processing stage can be operations that are performed on the event data for the events that belong to the first event batch. In some implementations, the operations of the first processing stage can be performed irrespective of whether result data from other processing stages is available (e.g., without result data from other processing stages). For example, the operations of the first processing stage can include operations that determine a total number of impressions, a total number of conversions, and/or a total number of user interactions that are represented by the event data for the events that belong to the first event batch.

A second computing group receives the first event batch (504). The second computing group is configured to perform operations of a second processing stage. The operations of the second processing stage can include operations that are performed on result data that are output by the first processing stage. For example, the second computing group can be configured to compute an interaction rate using a total number of impressions and a total number of user interactions that were determined during the first processing stage. The second computing group can also compute a temporal interaction rate using the total number of user interactions (or the updated total number of user interactions) and the time period (e.g., 2 minutes).

Event data for the events that belong to the first event batch are prevented from being processed by the second computing group until the first results have been logged (506). In some implementations, the prevention can be achieved by not providing the first event batch to the second computing group until the first results have been logged. In some implementations, the prevention can be achieved by providing instructions to the second computing group that processing of the first event batch is not to proceed until result data from the first processing stage is available in the results data store, or until data indicating that the result data has been stored in the results data store.

Preventing the first event batch from being processing by the second computing group in this manner reduces the likelihood that the results output by the second computing group will have been computed using incomplete results from the first computing group. For example, it is possible that the second computing group may begin processing the first event batch prior to the first computing group completely processing the first event batch. Thus, the results of the first processing stage that are used by the second computing group may be skewed, or otherwise inaccurate. Preventing the first event batch from being processed by the second computing group until the first computing group has completed its processing of the first event batch ensures that that the results of the first processing stage will have been computed using all of the event data for the events in the first event batch.

Event data for the events that belong to first event batch are processed by the first computing group (508). For example, the processing can include computing a total number of impressions that are represented by the event data for the events that belong to the first event batch. The processing can also include computing a total number of user interactions (or conversions) that are represented by the event data for the events that belong to the first event batch.

In some implementations, the first computing group can determine that the number of user interactions (or other events) exceeds a threshold number of user interactions. The determination can be made, for example on a per-resource basis and/or a per-entity basis. In response to determining that the total number of events exceeds the threshold number of events, the first computing group can classify one or more user interactions (or other events) for the resource (or by performed by the entity) as invalid events. For example, the first computing group can store the one or more user interactions with data that identify the one or more user interactions as invalid events.

In some implementations, the first computing group can further determine an updated total number of user interactions for resources for which the event data included invalid events. The updated total number of user interactions can be determined using the events (e.g., user interactions) that have not been classified as invalid user interactions.

A determination is made that processing of the first event batch by the first computing group has been completed (510). As described above, the determination can be made when at least a threshold number of event bundles from the first batch have been processed.

First results of the first processing stage are logged a results data store (512). In some implementations, the results are logged by being stored in a results data store from which the results are accessible to other computing groups (or other data processing apparatus). For example, the total number of impressions and/or the total number of user interactions that are represented by the event data can be stored in a results data store. In response to logging the first results to the results data store, the second computing group can be enabled to process the user interactions that have not been classified as invalid user interactions.

The first results and event data for the events that belong to the first event batch are processed by the second computing group (514). In some implementations, the processing includes performing operations of the second processing stage. For example, the processing can include determination of an interaction rate using the total number of user interactions and the total number of impressions that were determined by first processing stage. As noted above, the interaction rate can also be determined on a temporal basis such that the interaction rates is determined based on a total number of user interactions (or other events) relative to the period of time over which the user interactions occurred. In some implementations, the interaction rate is determined using only those user interactions (or other events) that have not been classified as invalid user interactions.

The processing performed by the second computing group can also include determining that an interaction rate threshold is exceeded by the interaction rate for one or more different resources (or devices). In response to determining that the interaction rate exceeds the interaction rate threshold, one or more user interactions (or other event data) for each resource for which the interaction rate exceeds the threshold can be classified as an invalid event. For example, the one or more user interactions can be stored with data identifying the user interactions as invalid events.

In some implementations, the second computing group can also compute an updated interaction rate for each resource for which invalid events were identified. The updated interaction rate can be computed, for example, using only those user interactions that have not been classified as invalid events (e.g., by the first or second computing groups).

Second results of the second processing stage are logged (516). In some implementations, the results are logged by being stored in a results data store from which the results are accessible to other computing groups (or other data processing apparatus). In response to logging the second results to the results data store, another computing group can be enabled to process the user interactions that have not been classified as invalid user interactions. The other computing group can also be enabled to process the second results.

Figure 6:
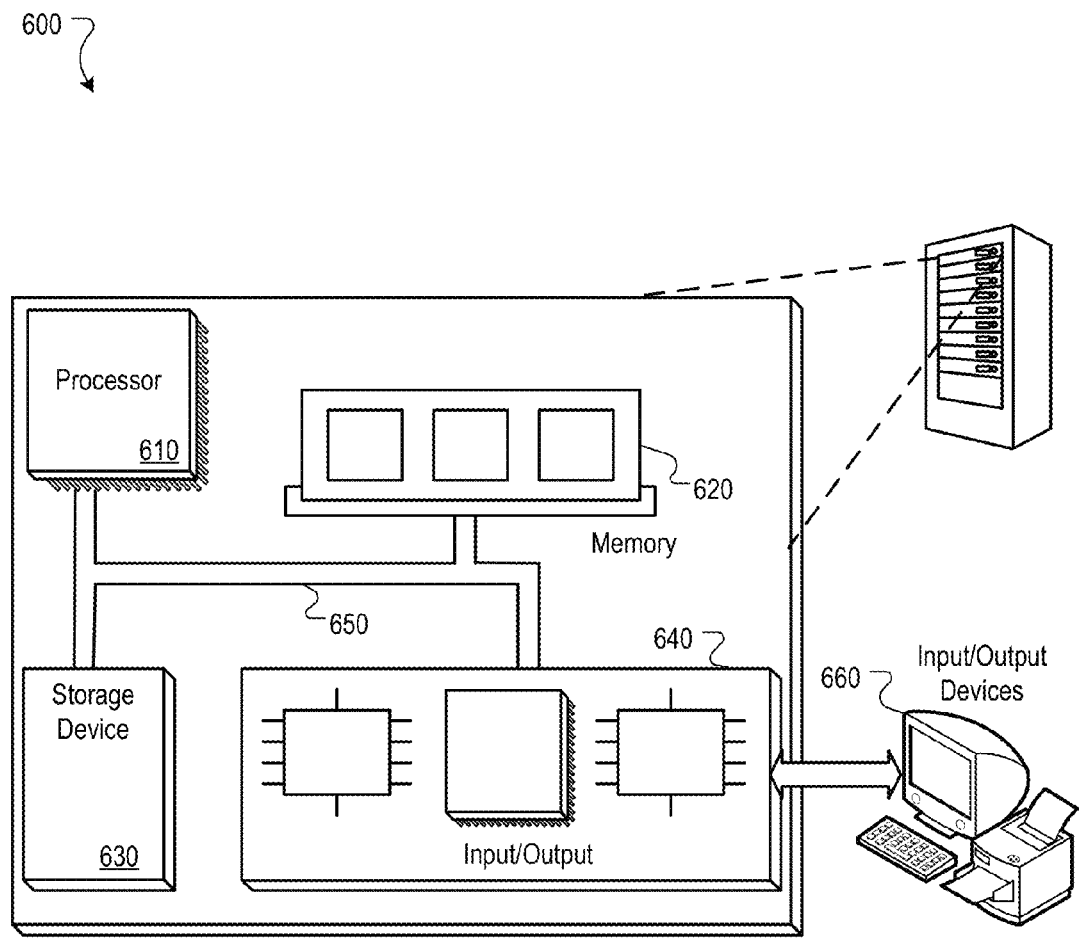
FIG. 6 is block diagram of an example computer system.

FIG. 6 is block diagram of an example computer system 600 that can be used to perform operations described above. The system 600 includes a processor 610, a memory 620, a storage device 630, and an input/output device 640. Each of the components 610, 620, 630, and 640 can be interconnected, for example, using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 can include, for example, a hard disk device, an optical disk device, a storage device that is shared over a network by multiple computing devices (e.g., a cloud storage device), or some other large capacity storage device.

The input/output device 640 provides input/output operations for the system 600. In one implementation, the input/output device 640 can include one or more of a network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 660. Other implementations, however, can also be used, such as mobile computing devices, mobile communication devices, set-top box television client devices, etc.

Although an example processing system has been described in FIG. 6, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
receiving event data specifying a set of events that have occurred, the set of events including advertising impressions and user interactions with advertisements, the event data for each event including a timestamp indicative of a time at which the event occurred;
assigning the events to event bundles based on the timestamps, each event bundle containing events having timestamps that are within a pre-specified period of time;
creating event batches, each event batch including a pre-specified number of event bundles;

providing, during a first processing cycle in which one or more processing stages are performed, a first event batch to each of a first computing group and a second computing group, each computing group including one or more data processing apparatus, the first computing group being a computing group that is configured to perform operations of a first processing stage, the second computing group being a computing group that is configured to perform operations of a second processing stage;

determining that a threshold number of the event bundles in the first event batch have been processed by the first computing group;

in response to the determination, providing, during a second processing cycle in which one or more processing stages are performed, a second event batch to each of the first computing group and the second computing group;

determining that the threshold number of the event bundles in the first event batch and results from the first processing stage have been processed by the second computing group during the second processing cycle; and providing, during a third processing cycle in which one or more processing stages are performed, a third event batch to each of the first computing group and the second computing group based on the determination that the threshold number of the event bundles in the first event batch and results from the first processing stage have been processed by the second computing group during the second processing cycle.

2. The method of claim 1, wherein:

operations of the second processing stage comprise operations that are performed on first result data from the first processing stage, the first result data being data that are output as a result of the first processing stage; and operations of a third processing stage comprise operations that are performed on second result data from the second processing stage, the second result data being data that are output as a result of the second processing stage.

3. The method of claim 1, wherein determining that a threshold number of event bundles in the first event batch have been processed by the first computing group comprises:

determining that all of the event bundles in the first event batch have been processed by the first computing group; and determining that a first result from the first processing stage is available to be processed by the second computing group.

4. The method of claim 1, wherein assigning the events to event bundles comprises:

identifying a first set of events having timestamps specifying times that are in a first pre-specified period;

grouping the first set of events to a first event bundle, the first event bundle having a first event bundle identifier;

identifying a second set of events having timestamps specifying times that are in a second pre-specified period; and grouping the second set of events to a second event bundle, the second event bundle having a second event bundle identifier having at least one different character than the first event bundle identifier.

5. The method of claim 4, wherein the first pre-specified period and the second pre-specified period are temporally adjacent periods and have a matching duration.

6. The method of claim 1, wherein creating event batches comprises creating event batches in which two or more of the event batches include a same number of event bundles.

7. The method of claim 1, further comprising:

receiving, by the first computing group that performs operations of a first processing stage, the first event batch;

processing event data for the events that belong to first event batch;

determining that processing of the first event batch has been completed; and logging first results of the first processing stage to a data store.

8. The method of claim 7, wherein determining that processing of the first batch has been completed comprises determining that a threshold number of event bundles from the first batch has been processed.

9. The method of claim 7, further comprising:

receiving, by a second computing group that performs operations of a second processing stage, the first event batch;

preventing the first event batch from being processed by the second computing group until the first results have been logged;

determining that the first results have been logged; and processing the first results and event data for the events that belong to the first event batch, the processing including performing the operations of the second processing stage; and logging second results of the second processing stage.

10. A computer storage medium encoded with a computer program, the program comprising instructions that when executed by data processing apparatus cause the data processing apparatus to perform operations comprising:

receiving event data specifying a set of events that have occurred, the set of events including advertising impressions and user interactions with advertisements, the event data for each event including a timestamp indicative of a time at which the event occurred;

assigning the events to event bundles based on the timestamps, each event bundle containing events having timestamps that are within a pre-specified period of time;

creating event batches, each event batch including a pre-specified number of event bundles;

providing, during a first processing cycle, a first event batch to each of a first computing group and a second computing group, each computing group including one or more data processing apparatus, the first computing group being a computing group that is configured to perform operations of the first processing stage, the second computing group being a computing group that is configured to perform operations of a second processing stage;

determining that a threshold number of the event bundles in the first event batch have been processed by the first computing group;

in response to the determination, during a second processing cycle, a second event batch to each of the first computing group and the second computing group;

determining that the threshold number of the event bundles in the first event batch and results from the first processing stage have been processed by the second computing group during the second processing cycle; and providing, during a third processing cycle, a third event batch to each of the first computing group and the second computing group based on the determination that the threshold number of the event bundles in the first event batch and results from the first processing stage have been processed by the second computing group during the second processing cycle.

11. A system comprising:
a data store storing event data for a plurality of events specifying a set of events that have occurred, the set of events including advertising impressions and user interactions with advertisements, the event data for each event including a timestamp indicative of a time at which the event occurred; and
an event processing apparatus configured to interact with the data store and to perform operations comprising:
receiving event data;
assigning the events to event bundles based on the timestamps, each event bundle containing events having timestamps that are within a pre-specified period of time;
creating event batches, each event batch including a pre-specified number of event bundles;
providing, during processing cycle in which one or processing stages are performed, a first event batch to each of a first computing group and a second computing group, each computing group including one or more data processing apparatus, the first computing group being a computing group that is configured to perform operations of a first processing stage, the second computing group being a computing group that is configured to perform operations of a second processing stage;
determining that a threshold number of the event bundles in the first event batch have been processed by the first computing group;
in response to the determination, during a second processing cycle in which one or more processing stages are performed, a second event batch to each of the first computing group and the second computing group;
determining that the threshold number of the event bundles in the first event batch and results from the first processing stage have been processed by the second computing group during the second processing cycle; and
providing, during a third processing cycle in which one or more processing stages are performed, a third event batch to each of the first computing group and the second computing group based on the determination that the threshold number of the event bundles in the first event batch and results from the first processing stage have been processed by the second computing group during the second processing cycle.

12. The system of claim 11, wherein:
operations of the second processing stage comprise operations that are performed on first result data from the first processing stage, the first result data being data that are output as a result of the first processing stage; and
operations of a third processing stage comprise operations that are performed on second result data from the second processing stage, the second result data being data that are output as a result of the second processing stage.

13. The system of claim 11, wherein determining that a threshold number of event bundles in the first event batch have been processed by the first computing group comprises:
determining that all of the event bundles in the first event batch have been processed by the first computing group; and
determining that a first result from the first processing stage is available to be processed by the second computing group.

14. The system of claim 11, wherein assigning the events to event bundles comprises:
identifying a first set of events having timestamps specifying times that are in a first pre-specified period;
grouping the first set of events to a first event bundle, the first event bundle having a first event bundle identifier;
identifying a second set of events having timestamps specifying times that are in a second pre-specified period; and
grouping the second set of events to a second event bundle, the second event bundle having a second event bundle identifier having at least one different character than the first event bundle identifier.

15. The system of claim 14, wherein the first pre-specified period and the second pre-specified period are temporally adjacent periods and have a matching duration.

16. The system of claim 11, wherein creating event batches comprises creating event batches in which two or more of the event batches include a same number of event bundles.

17. The system of claim 11, wherein the event processing apparatus is further configured to perform operations including:
receiving, by the first computing group that performs operations of a first processing stage, the first event batch;
processing event data for the events that belong to first event batch;
determining that processing of the first event batch has been completed; and
logging first results of the first processing stage to a data store.

18. The system of claim 17, wherein determining that processing of the first batch has been completed comprises determining that a threshold number of event bundles from the first batch has been processed.

19. The system of claim 17, wherein the event processing apparatus is further configured to perform operations including:
receiving, by a second computing group that performs operations of a second processing stage, the first event batch;
preventing the first event batch from being processed by the second computing group until the first results have been logged;
determining that the first results have been logged; and
processing the first results and event data for the events that belong to the first event batch, the processing including performing the operations of the second processing stage; and
logging second results of the second processing stage.

* * * * *